E. STERNS.
VEHICLE TIRE.
APPLICATION FILED MAR. 6, 1917.

1,367,994.

Patented Feb. 8, 1921.

Inventor:
EDWARD STERNS,
John N. Bruninga
His Attorney.

UNITED STATES PATENT OFFICE.

EDWARD STERNS, OF ST. LOUIS, MISSOURI, ASSIGNOR, BY MESNE ASSIGNMENTS, TO SURETY TIRE & RUBBER COMPANY, OF WILMINGTON, DELAWARE, A CORPORATION OF DELAWARE.

VEHICLE-TIRE.

1,367,994.  Specification of Letters Patent.  Patented Feb. 8, 1921.

Application filed March 6, 1917. Serial No. 152,903.

*To all whom it may concern:*

Be it known that I, EDWARD STERNS, a citizen of the United States, and residing at St. Louis, in the State of Missouri, have invented a certain new and useful Improvement in Vehicle-Tires, of which the following is a specification.

This invention relates to vehicle tires, and more particularly, to tires embodying a casing and an inner tube.

In U. S. Patent No. 1,218,486, granted March 6, 1917, I have shown and described a vehicle tire embodying an inflatable inner tube comprising a body material having the characteristics of rubber and a reinforcing material joined together to form an integral structure, the tube wall increasing in thickness from the inner to the outer circumference of the tube. The reinforcing material is arranged to permit transverse expansion of the tube. The reinforcing material is also arranged in spaced layers embedded in the body material, so as to form a structure in which punctures are not only prevented, but any punctures which are formed are self-closing.

Some of the objects of this invention are to provide a special form of inner tube of the character shown and described in the patent referred to, in which means are provided for permitting transverse expansion of the tube along its side walls.

Further objects will appear from the detail description taken in connection with the accompanying drawing, in which—

Figure 1:
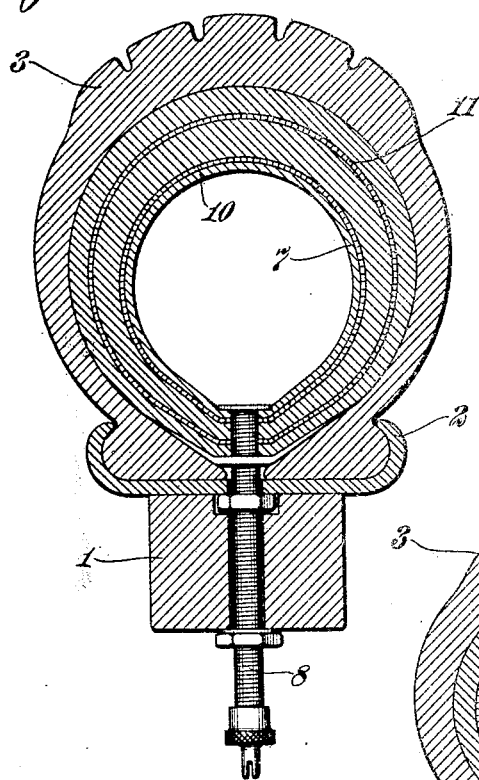
Figure 1 is a section through a vehicle tire embodying this invention, and showing the tire inflated.
Figure 4:
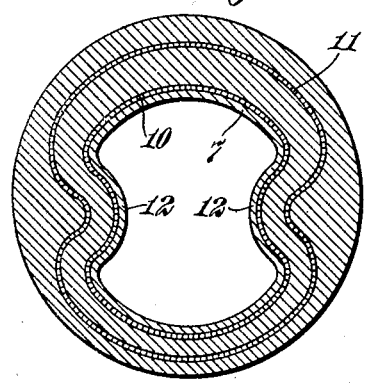
Fig. 4 is a section on the line 4—4, Fig. 3.

Referring to the accompanying drawing, 1 designates a wheel felly provided with a rim 2 adapted to receive a casing 3. The wheel, rim and casing may be of any suitable constructions, the casing being in this case of the clencher type.

The inner tube 7, provided with a valve stem 8 of usual construction, is, as in the patent referred to, formed of a body material of inner tube rubber, or of a suitable material having the characteristics of rubber, and the wall thickness increases from the inner to the outer circumference of the tube. The body material has also embedded therein, to form an integral structure, spaced layers 10 and 11 of a reinforcing material, such as sea island cotton. In accordance with this invention, however, the layers 10 and 11 extend uninterruptedly transversely along the walls of the tube. Now, as pointed out in the patent referred to, it is necessary that an inner tube be expansible to conform to and form a suitable backing for the casing. In accordance with this invention, therefore, the tube is thickened to form inward projections or ribs 12 along the sides and at diametrically opposed points, and the layers of fabric 10 and 11 are arranged to follow the inside walls of the tube and the projecting ridges 12.

Figure 2:
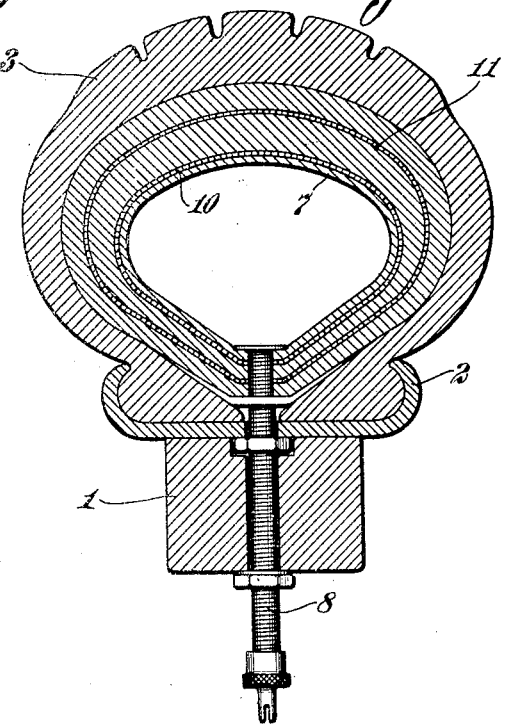
Fig. 2 is a section similar to Fig. 1, but showing the tire partially compressed.
Figure 3:
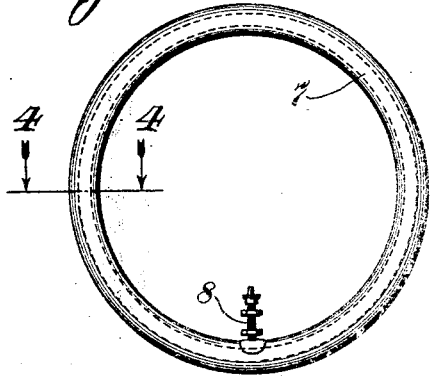
Fig. 3 is a side elevation of the deflated inner tube.

When the tube is inflated the tube walls cannot stretch transversely where the reinforcing layers parallel the outer surface of the tube, since the fabric is inelastic. Inflation of the tube under a pressure of seventy-five (75) pounds will however, straighten out the reinforcement paralleling the ridges 12, the rubber stretching at these points as shown in Figs. 1 and 2, which show the tube inflated, so that when the tube is fully inflated the reinforcing layers will conform transversely to the outer surface of the tube and form a wall of increasing thickness from the inner to the outer circumference of the tube. With this construction, therefore, the expansion is distributed equally along the sides of the tube, so that the tube will be in a proper condition for use.

With this tube, as in the patent referred to, a layer of rubber is imprisoned between the layers of fabric, and puncturing of the tube will, therefore, cause the rubber imprisoned between the two non-elastic layers of fabric to close any puncture which may be formed. It will be noted that the stretch of the rubber will come at the sides, where the danger of puncturing is remote, and where the only damage done is cuts or gashes which do not penetrate the tube. The compensating ridges are, however, placed in a position removed from the tread where all of the puncturing takes place. In this tire also the breaking lines of the tube correspond to the breaking lines of the casing.

It is obvious that various changes may be made in the details of construction without departing from the spirit of this invention, and it is to be understood, therefore, that this invention is not to be limited to the specific details shown and described.

Having thus described the invention, what is claimed is:

1. In a vehicle tire, the employment of an inflatable inner tube of elastic material having combined therewith at the tread thereof layers of inelastic material disposed in axially spaced relation to confine a puncture-closing layer of the elastic material therebetween and adapted and arranged to permit transverse expansion of the tube at the side thereof but prevent expansion of the confined elastic material at the tread, substantially as and for the purpose set forth.

2. In a vehicle tire, the employment of an inflatable inner tube of elastic material having combined therewith at the tread thereof layers of inelastic material disposed in axially spaced relation to confine a puncture-closing layer of the elastic material therebetween and adapted and arranged to permit transverse expansion of the tube at diametrically opposed points but prevent expansion of the confined elastic material at the tread, substantially as and for the purpose set forth.

3. In a vehicle tire, the employment of an inflatable inner tube of elastic material having combined therewith at the tread thereof uninterrupted layers of inelastic material disposed in axially spaced relation to confine a puncture-closing layer of the elastic material therebetween and adapted and arranged to permit transverse expansion of the tube but prevent expansion of the confined elastic material at the tread, substantially as and for the purpose set forth.

4. In a vehicle tire, the employment of an inflatable inner tube of elastic material having a thickened tread and having combined therewith uninterrupted layers of inelastic material disposed in axially spaced relation at the tread to confine a puncture-closing layer of the elastic material therebetween, said inelastic layers extending from the tire rim transversely around the tread, adapted to permit transverse expansion of the tube but prevent expansion of the confined elastic material at the tread, substantially as and for the purpose set forth.

5. In a vehicle tire, the employment of an inflatable inner tube of rubber increasing in thickness from the tire rim to the tread and having embedded therein fabric strips extending in uninterrupted circuits transversely around the tube and disposed in axially spaced relation at the tread to confine a puncture-closing layer of the rubber therebetween, said fabric strips being adapted to permit transverse expansion of the tube at the sides thereof substantially as and for the purpose set forth.

In testimony whereof I affix my signature this 8th day of July, 1916.

EDWARD STERNS.